(12) United States Patent
Jost et al.

(10) Patent No.: US 8,590,135 B2
(45) Date of Patent: Nov. 26, 2013

(54) DEVICE AND METHOD FOR LOADING AND UNLOADING A MACHINING MACHINE FOR MACHINING BOARDS

(75) Inventors: Stefan Jost, Aeschi (CH); Jürg Zimmerli, Lotzwil (CH); Jürg Messer, Oberdorf (SE)

(73) Assignee: Bystronic Laser AG, Niederonz (CH)

( * ) Notice: Subject to any disclaimer, the term of this patent is extended or adjusted under 35 U.S.C. 154(b) by 1539 days.

(21) Appl. No.: 12/002,803

(22) Filed: Dec. 18, 2007

(65) Prior Publication Data

US 2008/0182737 A1 Jul. 31, 2008

(30) Foreign Application Priority Data

Dec. 19, 2006 (EP) ..................................... 06405534

(51) Int. Cl.
 *B23Q 7/00* (2006.01)
 *B23P 23/00* (2006.01)
(52) U.S. Cl.
 USPC ................... 29/563; 414/222.07; 414/222.11; 414/222.12; 414/225.01
(58) Field of Classification Search
 USPC ................ 29/563, 33 P; 414/222.01, 222.07, 414/222.11, 222.12, 225.01
 See application file for complete search history.

(56) References Cited

U.S. PATENT DOCUMENTS

| | | | |
|---|---|---|---|
| 4,796,341 A * | 1/1989 | Kuhn, II | 29/33 P |
| 5,765,984 A | 6/1998 | Stefano et al. | |
| 6,046,428 A | 4/2000 | Serruys | |
| 6,413,035 B1 | 7/2002 | Kaneko | |
| 6,609,875 B1 | 8/2003 | Araki | |
| 2003/0147729 A1 | 8/2003 | Leibinger et al. | |
| 2004/0240980 A1 | 12/2004 | Nakazato et al. | |
| 2005/0072767 A1 | 4/2005 | Leibinger et al. | |

FOREIGN PATENT DOCUMENTS

| | | |
|---|---|---|
| EP | 0 780 172 A2 | 6/1997 |
| EP | 0 919 320 A1 | 6/1999 |
| FR | 2 842 754 | 1/2004 |

* cited by examiner

*Primary Examiner* — Erica E Cadugan
(74) *Attorney, Agent, or Firm* — Cowan, Liebowitz & Latman, P.C.; Mark Montague, Esq.

(57) ABSTRACT

A method for loading and unloading a machining machine for machining boards that includes for loading the machining machine, the changing table is loaded with a board to be machined, whereby the board is separated from the first storage place and is deposited on a changing table. The changing table is conveyed together with the board to the machining machine. For unloading the machining machine, the changing table is conveyed together with a machined board to the second storage place and is then unloaded, wherein the machined board is separated from the changing table and deposited on the second storage place, wherein the unloading of the changing table includes conveying the changing table and the machined board to an unloading place in an area above the second storage place and the machined board is separated from the changing table at the unloading place.

4 Claims, 9 Drawing Sheets

DEVICE AND METHOD FOR LOADING AND UNLOADING A MACHINING MACHINE FOR MACHINING BOARDS

RELATED APPLICATIONS

Applicants claim, under 35 U.S.C. §119, the benefit of priority of the filing date of Dec. 19, 2006 of a European patent application, copy attached, Serial Number 06405534.6 filed on the aforementioned date, the entire contents of which is incorporated herein by reference.

BACKGROUND

1. Technical Field

The present invention relates to a device for loading and unloading a machining machine for machining boards.

2. Background Information

The term "board" as used here is understood in general to refer to a relatively thin flat object made of a solid material (e.g., metal, stone or wood).

In industrial manufacturing, devices and methods for machining boards are used in a variety of ways, e.g. for cutting, coating or machining surfaces of boards. To achieve a high productivity, automatic machining systems are generally used, including not only a machining machine for boards but also an automatic device for loading and unloading the machining machine.

Known devices for loading and unloading usually includes a storage system which includes a first storage place for boards to be machined and a second storage place for the boards machined by the machining machine, and a conveyance device for conveying the boards to be machined and for conveying the machined boards between the storage system and the machining machine.

The conveyance device usually includes at least one changing table on which a board to be machined or a machined board may be situated, whereby the respective changing table can be conveyed between the storage system and the machining machine for conveyance of the boards along one or more predetermined paths.

The respective changing table is usually brought to a predetermined loading place for loading with boards. For automatic loading, a loading device is usually provided, designed to remove a board for machining from the first storage place and depositing it on the respective changing table at the loading place. Accordingly, a changing table loaded with a machined board may be unloaded at a predetermined unloading place. For automatic unloading, an unloading device is usually provided, designed for removing a machined board from the respective changing table at the unloading place and depositing it at the second storage place.

In the design of automatic machining systems, several optimization criteria are usually taken into account. First, the machining machine should achieve a high throughput of boards. Secondly, the machining system should take up the least possible amount of space, e.g., with regard to the required floor space and/or height in a room. In addition, the conveyance device should ensure a conveyance capacity (high) adapted to the throughput of the machining machine in the simplest possible manner (the conveyance capacity being characterized, for example, as the number of boards conveyed per unit of time between the machining machine and the respective storage places).

To allow a high conveyance capacity, a machining system is usually equipped with multiple changing tables which can circulate simultaneously between the machining machine and the respective storage places along predetermined paths. For example, it is therefore possible to load a changing table (empty) with a board for machining, while another board—lying on another changing table—is being machined by the machining machine or a board that has already been machined is moved away from the machining machine in the direction of the storage system.

To facilitate circulation of multiple changing tables between the machining machine and the storage system, automatic machining systems are usually provided with a so-called changing table changer. A changing table changer is usually a device includes at least two different guide paths for changing tables, whereby the guide paths are designed so that a changing table to be conveyed between the storage system and the machining machine may optionally be moved along at least one of the respective guide paths of the changing table changer. Conventional changing table changers make it possible, for example, for a first changing table to assume a place on a guide path of the changing table changer while another changing table is moved past the first changing table in a predetermined direction along another guide path. The changing table changer makes it possible, for example, for several changing tables to be moved between the machining machine and the storage system in opposite directions without any mutual hindrance.

Typical machining systems are usually designed so that a changing table can be loaded and/or unloaded when the changing table assumes a place on the changing table changer, i.e., in this case the loading place and the unloading place of the changing table are each situated directly in the area of the changing table changer.

To largely reduce the floor space required by the machining system, the storage system may be designed, for example, so that the respective storage places for the boards to be machined and the boards that had been machined are arranged one above the other.

With regard to the arrangement of the changing table changer in relation to the machining machine and the storage system, several variants are usually taken into account. The changing table changer may be arranged, for example, next to the storage system, e.g., in an intermediate space between the machining machine and the storage system. According to another variant, the changing table changer is arranged in the same plane with the machining machine, the storage system being arranged directly above the changing table changer. The latter variant has the advantage over the variant mentioned previously that the changing table changer and the storage system jointly take up a particularly small amount of floor space, but it also has the disadvantage that the changing table is not readily accessible (because of the arrangement of the storage system).

For the case when the respective loading place and the respective unloading place for the boards are provided on the changing table changer, the two variants mentioned above have the disadvantage that boards must be moved both horizontally and vertically in both loading and unloading a changing table over relatively long paths which often involve curves. For this reason, conveyance of the boards between the loading place and/or the unloading place and the respective storage places is associated with complicated movements of the boards, usually in three dimensions. The designs of the loading device and/or unloading device are complicated accordingly. In addition, this requires a complicated control of the movement processes.

Another disadvantage may be regarded as the fact that the loading and unloading of changing tables may be time-consuming if the loading place and the unloading place of the changing tables are each provided at the place of the changing table changer, i.e., essentially at the same location. In this case, multiple changing tables cannot be loaded and/or unloaded at any points in time, for example, because the conveyance of the changing tables, the boards to be machined and the boards that had been machined must be coordinated accordingly. Simultaneous loading and unloading of various changing tables are usually impossible. This has a negative effect on the conveyance capacity of the conveyance device.

OBJECTS AND SUMMARY OF THE INVENTION

An object of the present invention is to avoid the aforementioned disadvantages and to create a device and a method for loading and unloading a machining machine for machining boards which will simplify the loading and unloading of changing tables and will reduce the time required for loading and unloading.

The above mentioned object is achieved by a device for loading and unloading a machining machine for machining boards, the device including a storage system. The storage system including a first storage place for boards that are to be machined and a second storage place for the boards that have already been machined by the machining machine. The device further including a conveyance device for conveying the boards that are to be machined and for conveying the boards that have been machined between the first storage system and the machining machine. The conveyance device including a changing table for at least one board that is to be machined or a board that has already been machined and a loading device for loading the changing table and an unloading device for unloading the changing table. The changing table can be conveyed between the first storage system and the machining machine and can be brought to a loading place and to an unloading place, the loading device is designed to remove a board that is to be machined from the first storage place and deposit the board at the loading place on the changing table and the unloading device is designed to remove a board that has already been machined from the respective changing table at the unloading place and deposit it on the second storage place, wherein the unloading place of the respective changing table is provided in an area above the second storage place.

The above mentioned object is achieved by a method for loading and unloading a machining machine for machining boards, wherein at least one changing table is conveyed between the machining machine and a first storage place for boards to be machined and the second storage place for boards that have already been machined. The method includes for loading the machining machine, the changing table is loaded with at least one board that is to be machined, whereby the at least one board is separated from the first storage place and is deposited on the changing table, and the changing table is conveyed together with the at least one board that is to be machined to the machining machine. For unloading the machining machine, the changing table is conveyed together with at least one board that has been machined from the machining machine to the second storage place and is then unloaded, wherein the at least one board that has been machined is separated from the changing table and deposited on the second storage place, wherein the unloading of the changing table includes conveying the changing table and the at least one board that has been machined to an unloading place in an area above the second storage place and the at least one board that has been machined is separated from the changing table at the unloading place.

When the changing table is situated in an area of either the parking place, a grating or an insert or a support for depositing at least one of the boards can be installed at the respective changing table or can be removed from the changing table or can be replaced at the changing table.

The prevent invention regarding a device for loading and unloading a machining machine for machining boards has a storage system which comprises a first storage place for the boards to be machined and a second storage place for the boards already machined by the machining machine, and a conveyance device for conveying the boards that are to be machined and for conveying the boards that have already been machined between the storage system and the machining machine. The conveyance device includes at least one changing table for at least one board that is to be machined or one board that has been machined, a loading device for loading the changing table and an unloading device for unloading the changing table whereby the respective changing table can be conveyed between the storage system and the machining machine and can be brought to a loading place and to an unloading place, the loading device being designed to remove a board that is to be machined from the first storage place and to deposit it at the loading place on the respective changing table, and the unloading device is designed to remove a board that has already been machined from the respective changing table at the unloading place and deposit it at the respective storage place.

According to the present invention, the unloading place of the respective changing table is provided in an area above the second storage place.

This results in, among other things, the fact that the unloading place can be set up at a great distance spatially from the loading place, e.g., in such a way that a first changing table at the loading place and a second changing table at the unloading place are accessible simultaneously so that the two changing tables can be loaded and/or unloaded independently of one another, e.g., simultaneously. The latter merely presupposes that the loading device and the unloading device are designed for this purpose and can be controlled accordingly. In this way, it is possible to perform the loading and unloading of several changing tables in independent parallel processes. The parallel process management contributes toward an increase in the conveyance capacity of the conveyance device.

Due to the fact that the unloading place of the respective changing table is provided in an area above the second storage place, the prerequisite for a simplified design of the conveyance device and in particular the unloading device is also met. Under the aforementioned prerequisite, the distance between the unloading place and the second storage place is relatively short. To unload a changing table, the machined boards must subsequently be conveyed by the unloading device over only a short distance from the unloading place to the second storage place. It is also possible to design the unloading device so that a machined board need be moved only along a straight path (i.e., in a one-dimensional movement) in unloading. Such an unloading device can be implemented with especially simple (conventional) means and can be controlled relatively easily.

In one embodiment of the present invention, a board deposited on the respective changing table can be picked up by the unloading device at the unloading place, separated from the changing table and deposited at the second storage place after removal of the changing table. To this end, the unloading device may be equipped with a gripping device for gripping the boards that are to be conveyed and with a movement device for moving the gripping means. For example a hoisting device which allows a one-dimensional movement (e.g., in a vertical direction) may be provided as the movement device for the gripping device of the unloading device. Such a hoisting device can be implemented especially easily using conventional techniques and devices. Another advantage of this embodiment may be seen in the fact that the unloading device takes up very little space in unloading a changing table. The unloading device may essentially be arranged above the second storage place and usually does not take up any floor space—in a vertical projection onto the storage place and/or the floor—does not take up any more floor space than that required by the storage system.

In another embodiment of the present invention, multiple changing tables can circulate between the machining machine and the storage system within the automatic machining system and be loaded or unloaded in alternation. To this end, an automatic changing table changer that is provided is situated between the machining machine and the storage system. The changing table changer may be equipped with at least two guide paths, each serving to guide the changing tables and optionally being used temporarily as a waiting place for at least one of the changing tables. The changing table changer may be positioned within the machining system in such a way that the respective changing table can be conveyed between the storage system and the machining machine on at least one path which leads past the changing table changer, whereby the respective path of the changing table optionally leads over one of the guide paths of the changing table. A place in the area of the changing table changer may be used as the loading place of the respective changing table, e.g., on one of the guide paths of the changing table changer. This achieves a spatial separation between the loading place and the unloading place, which is sufficient for loading a changing table at the loading place and unloading another changing table at the unloading place in parallel operations.

In another embodiment of the present invention, the respective changing table is movable along a guide which extends beyond the changing table changer to a parking place for the changing table, as seen from the machining machine. This guide may lead past the storage system, for example, and may offer space for the parking place next to the storage system or on a side of the storage system facing away from the machining machine. A single changing table in the parking place may be subjected to a special treatment (including manual procedures) regardless of the momentary operating state of the machining system. For example, it is possible to convey one of several changing tables, which are circulating between the storage system and the machining machine during normal operation of the machining system, to the parking place and leave it there in a resting position for a certain period of time or remove it from the machining system either automatically or manually. In addition, it is possible to supply a changing table to the machining system (from the outside) via the parking place by setting this changing table on the aforementioned guide at the parking place and then conveying it in the direction of the machining machine.

In one variant, the guide is situated between the changing table changer and the parking place in such a way that it passes by and above one of the storage places. This variant is especially space saving.

In another embodiment of the present invention, individual parts may be removed from the respective changing tables and deposited on a third (additional) storage place of the storage system. This embodiment is useful in particular in the case of board machining operations based on dividing boards into individual parts (e.g., punching or cutting sheet metal or cutting wooden boards). In such applications, it is often desirable to separate a partial quantity of the individual parts of a machined board from the other individual parts of the board to then be able to deposit these other individual parts (not including the individual parts separated previously) jointly at the second storage place.

The separation of the individual parts may be performed, for example, with the help of the loading device or the unloading device. To this end, the loading device and/or the unloading device must be designed so that exclusively the individual parts to be separated can be gripped by the device. The individual parts to be separated can be removed from one of the changing tables by the loading device, for example, if the respective changing table is situated at the loading place. The removal of the individual parts may thus be performed independently of the unloading of the changing table, i.e., without the involvement of the unloading device.

Additional details of the present invention and exemplary embodiments of the inventive device and the inventive method in particular are explained below on the basis of the accompanying drawings, in which:

DETAILED DESCRIPTION OF THE PREFERRED EMBODIMENTS

Figure 1:
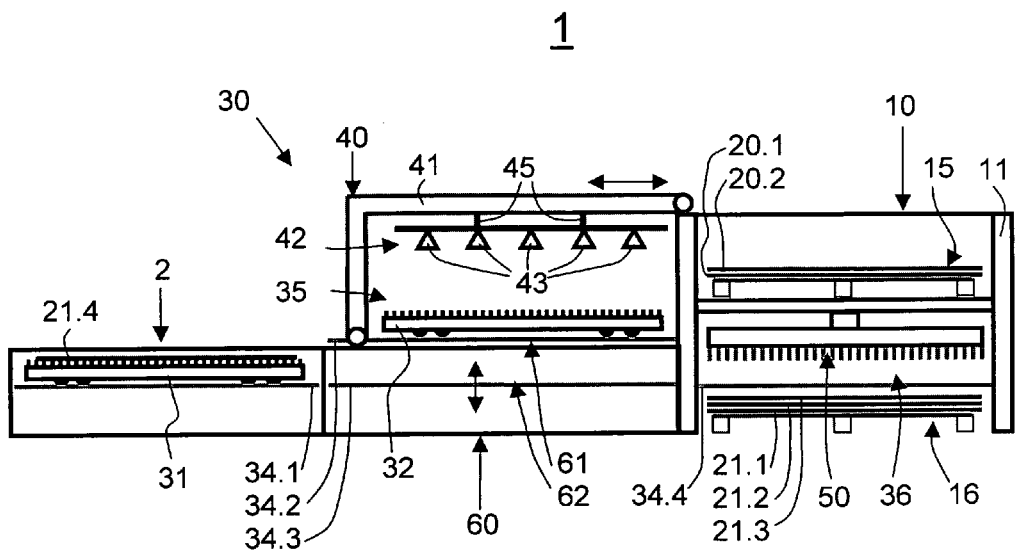
FIG. 1 shows an embodiment of an automatic machining system for boards in accordance with the present invention, with a machining machine for boards and a device for loading and unloading the machining machine, whereby two changing tables for boards circulate in the machining system, and the device comprises a storage system having a first and a second storage place for the boards to be machined and for boards that have already been machined and a loading device for loading the changing tables and an unloading device for unloading the changing tables.

FIG. 1 shows an automatic machining system 1 for boards, including a machining machine 2 for machining boards, a storage system 10 for boards that are to be machined and boards that have already been machined and a conveyance device 30 for conveying the boards that are to be machined and for conveying the boards that have already been machined between the storage system 10 and the machining machine 2.

The machining machine 2 may be, for example, a machine for cutting boards, which is therefore equipped with a cutting tool (e.g., a mechanical cutting tool, a device for laser cutting, a device for water jet cutting, etc.). However, the type of machining of the boards is not relevant within the scope of the present invention. The present descriptions of the machining system 1 therefore do not include any details indicating the type of machining and/or any concrete machining operation.

In the present discussions of the machining system 1, different boards to be machined by the machining machine 2 are labeled as 20.*x* (x=1, 2, . . . ) and boards that have already been machined by the machining machine 2 are labeled as 21.*x* (x=1, 2, . . . ).

The storage system 10 has a first storage place 15 for the boards 20.*x* to be machined and the second storage place 16 for boards 21.*x* that have already been machined. In the present example according to FIG. 1, the first storage place 15 has a stack of two boards 20.1 and 20.2 that are to be machined (with the board 20.2 lying at the top of the stack) and the second storage place 16 has a stack of three boards 21.1, 21.2 and 21.3 that have already been machined (with the board 21.3 lying at the top of the stack).

In the present example, the storage places 15 and 16 are arranged one above the other in a frame 11 of the storage system 10, with the first storage place 15 being situated above the second storage place 16. This arrangement of the storage places 15 and 16 is especially space saving. Within the context of the present invention, however, the relative arrangement of the storage places 15 and 16 is not particularly important (the first storage place 15 could also be beneath the second storage place 16, and the storage places could also be arranged side-by-side).

The conveyance device 30 includes:

Two changing tables (a first changing table 31 and a second changing table 32), each offering space for deposited one or more boards;

a guide for the changing tables formed by pairs of guide rails 34.1, 34.2, 34.3 and 34.4 (due to an arrangement of these guide rails side-by-side); (in the present example the changing tables 31 and 32 are guided on the aforementioned guide rails by rollers);

a conveyance mechanism (the conventional mechanism is not shown in the figures) for moving the changing tables 31 and 32 along the guide rails 34.1, 34.2, 34.3 and 34.4;

a changing table changer 60 having a first (upper) waiting place 61 and a second (lower) waiting place 62, one for each of the changing tables 31 and 32;

a loading device 40 for loading the changing tables 31 and 32 and an unloading device 50 for unloading the changing tables 31 and 32.

The guide rails 34.1 are arranged in or on the machining machine 2 and are designed so that there is room for a changing table there. This space may be utilized as a waiting place for a changing table. During operation of the machining system 1, a changing table (loaded with a board to be machined) may be parked here in a waiting position in which the board (lying on the changing table) can be machined by the machining machine 2. To illustrate this state, FIG. 1 shows the changing table 31 in a situation in which it is loaded with a board 21.4 to be machined and assumes a waiting position on the guide rails 34.1.

Figure 5:
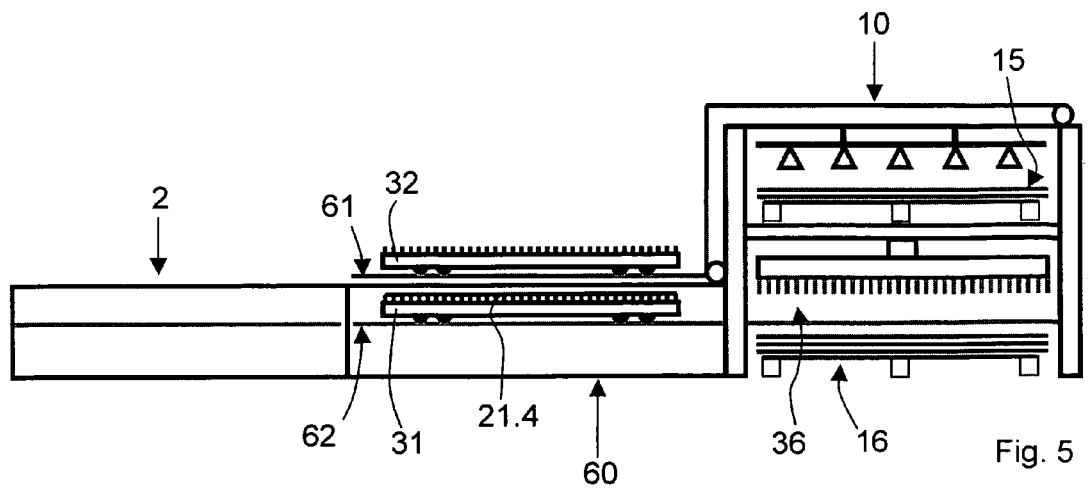
FIGS. 5-22 show the machining system according to FIG. 1, wherein the various operating states are shown, including unloading (FIGS. 5-14) and loading (FIGS. 1519) of a changing table and loading of the machining machine (FIGS. 20-22)
Figure 6:
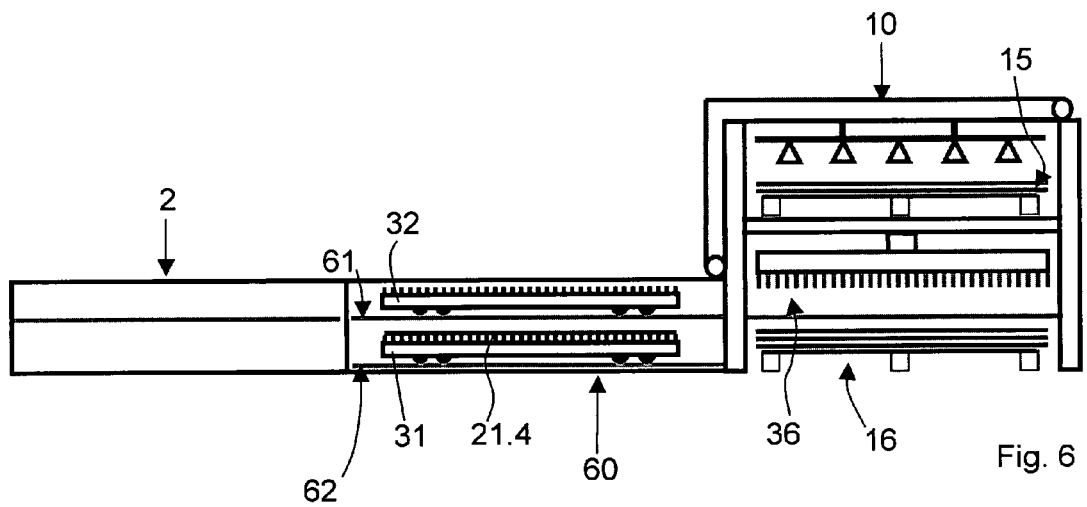
Figure 7:
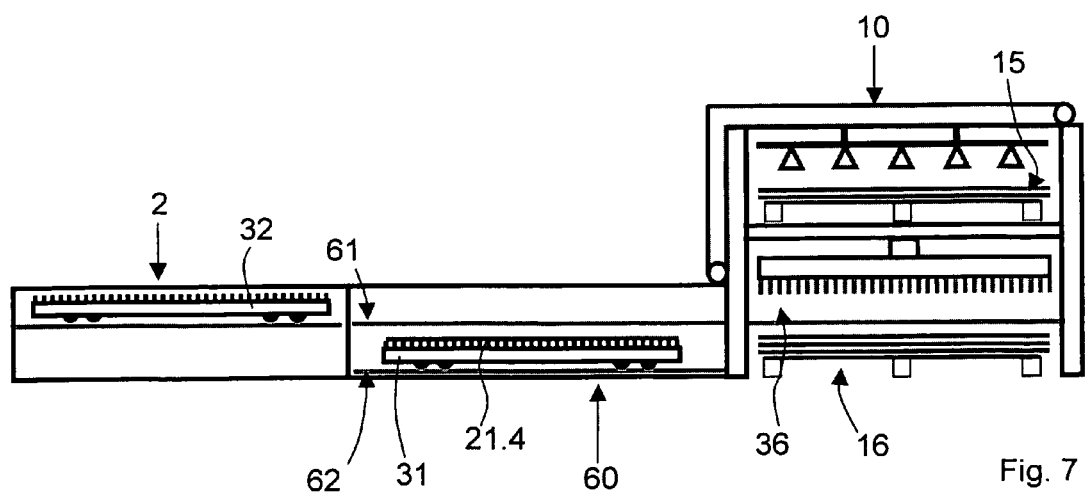

The changing table changer 60 is arranged between the machining machine 2 and the storage system 10. The first (upper) waiting place 61 is designed on the guide rails 34.2. The second (lower) waiting place 62 is designed on the guide rails 34.3. The two guide rails 34.2 and 34.3 are arranged one above the other and aligned so they are parallel with one another in different parallel planes, as illustrated in FIG. 1, where the distance between them is wide enough so that there is space for a changing table (loaded with at least one board to be machined or one board that has already been machined) at the waiting places 61 and 62. The guide rails 34.1 and 34.2 and/or the waiting places 61 and 62 can be raised or lowered together (indicated by a double vertical arrow in FIGS. 1 and 2) by means of a hoisting device (not shown in the figures) and in doing so moved between an upper position (FIGS. 1, 2, 5) and a lower position (FIGS. 6, 7). In the upper position of the guide rails 34.2 and 34.3, the guide rails 34.3 and/or the waiting place 62 are at the same level as the guide rails 34.1, so that a changing table can go smoothly from the waiting place 62 of the changing table changer 60 to the guide rails 34.1 in the area of the machining machine 2 (and conversely). In the lower position of the guide rails 34.2 and 34.3, the guide rails 34.2 and/or the first waiting place 61 are at the same level as the guide rails 34.1, so a changing table can go smoothly from the waiting place 61 of the changing table changer 60 to the guide rails 34.1 in the area of the machining machine 2 (and vice versa).

The guide rails 34.4 are arranged in the area of the storage system 10 in such a way that a changing table can find a place on the guide rails 34.4 in a waiting position above the second storage place 16 and beneath the first storage place 15. The respective height of the guide rails 34.4 is selected in the present example so that a changing table can go smoothly from the second waiting place 62 and/or the guide rails 34.3 to the guide rails 34.4 (and vice versa) when the guide rails 34.2 and 34.3 are in the upper position. In addition, a changing table can move smoothly from the first waiting place 61 and/or the guide rails 34.2 to the guide rails 34.4 (and vice versa) when the guide rails 34.2 and 34.3 are in the bottom position.

The arrangement of guide rails 34.1, 34.2, 34.3 and 34.4 thus allows a circulation of changing tables along two different paths between the guide rails 34.1 in the area of the machining machine 2 and the guide rails 34.3 in the area of the storage system 10, depending on the position of the guide rails 34.2 and 34.3 in the area of the changing table changer 60.

The loading device 40 is designed so that the boards to be machined are gripped by the loading device 40 at the first storage place 15 of the storage system 10 and conveyed to a loading place 35 which is above the changing table changer 60, where they can be deposited on a changing table.

To illustrate this state of affairs, FIG. 1 shows the changing table 32 in a waiting position on the loading place 35.

The loading device 40 includes:

a frame 41 which is movable in a horizontal direction and is supported in the present example by rollers on the framework 11 of the storage system 10 on the one hand and on the changing table changer 60 on the other hand, and a drive (not shown in the figures) for moving the frame 41 in the horizontal direction (indicated by a double arrow on the frame 41 in FIG. 1);

a suction system 42 that has a two-dimensional arrangement of suction cups 43 and is designed to grip and hold objects by suction by the suction cups 43; and a first hoisting device 45 for lifting and/or lowering the suction system 42.

To be able to load a changing table at the loading place 35, the suction system 42 can first be brought into a position above the first storage place 15 by the frame 41 (FIG. 2) and lowered by the first hoisting device 45 onto a board (to be machined) that has already been deposited on the first storage place 15 to be able to grip the board with the suction cups 43. Next a board that has been gripped can be separated from the first storage place 15 by raising the suction system 42 by the first hoisting device 45, then conveyed to the loading place 35 by an appropriate movement of the frame 41 and deposited on a changing table there.

Figure 3:
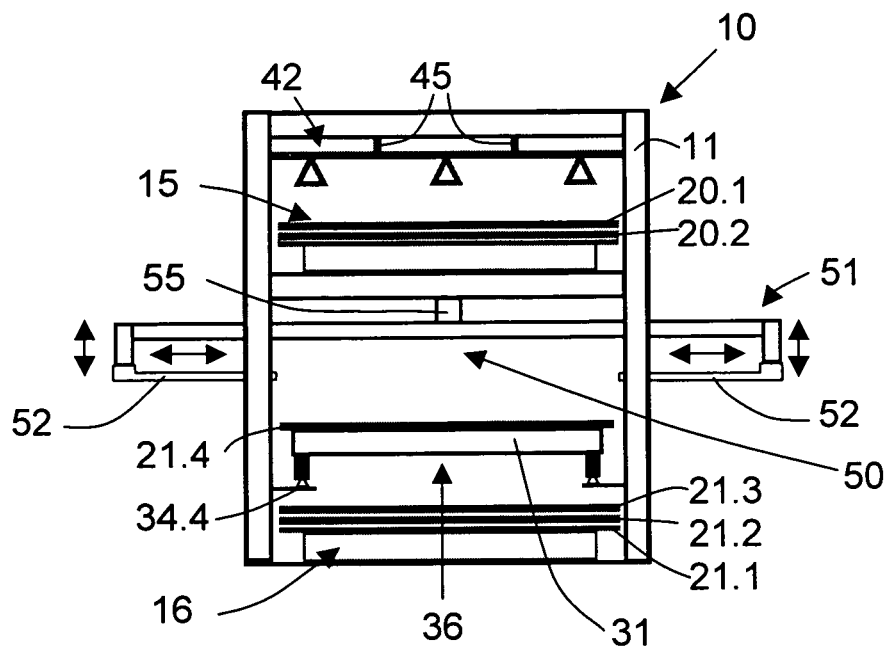
FIGS. 3 and 4 show the machining system according to FIG. 1 with the unloading device in two different operating states.
Figure 4:
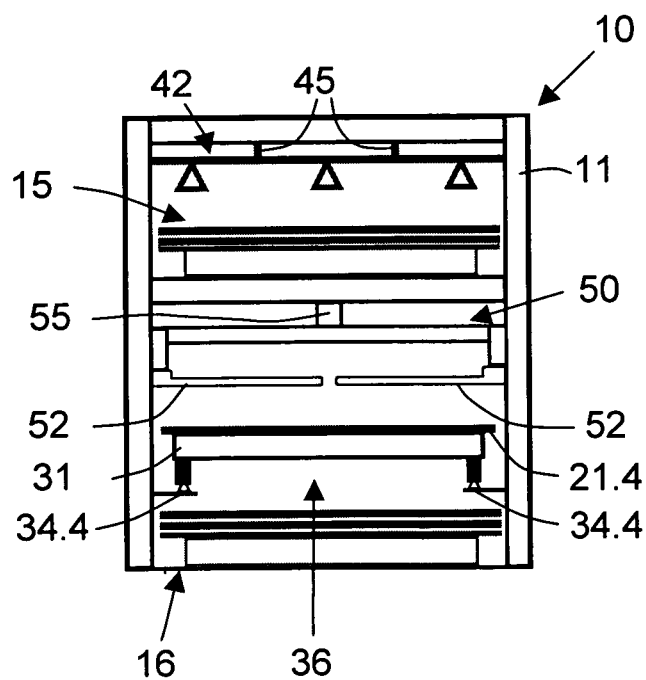

In FIGS. 1 and 3 and/or 4, the unloading device 50 is depicted from various perspectives while FIGS. 3 and 4 each show the unloading device in different operating states. FIGS. 3 and 4 show the machining system 1 illustrated in FIG. 1 in a view onto the storage system 11 (in the foreground) in the direction of the machining machine 2, i.e., with a view along the path that can be traveled by the changing tables 31 and 32 along the guide rails 34.1, 34.2, 34.3 and 34.4.

According to this embodiment of the present invention, an unloading place 36 of the machining system 1 is provided above the second storage place 16. For unloading, a changing table loaded with a board is conveyed to the unloading place 36 in the area of the guide rails 34.4 and brought into a waiting position. To illustrate this situation, FIGS. 3 and 4 show the changing table 31 together with the board 21.4 which has been machined and is to be removed, shown here in its waiting position at the unloading place 36.

The unloading device 50 is accommodated in an intermediate space between the first storage place 15 and the second storage place 16 above the unloading place 36 and includes in the present example:

a conventional fork system 51 having two forks 52 which arranged opposite one another and having a drive (not shown in the figures) for moving the forks 52 in a horizontal direction (indicated with double horizontal arrows in FIG. 3) and a second hoisting device 55 for raising and/or lowering the fork system 51 (indicated by vertical double arrows in FIG. 3).

Each fork 52 has a plurality of prongs, the pointed ends of which run horizontally and perpendicularly to the guide rails 34.4, with each being directed at the center of the storage system 10. The forks 52 may be moved simultaneously in the opposite direction parallel to the horizontal between an open position and a closed position. FIG. 3 shows the fork system 51 in the open position. The distance between the forks 52 is at its maximum in this position, i.e., wider than the width of the board 21.4 which is to be removed from a changing table 31 that is to be unloaded. FIG. 4 shows the fork system 51 in the closed position: the distance between the forks 52 in this position is minimal, i.e., is less than the width of the board 21.4 which is to be removed from the changing table 31 that is to be unloaded.

To be able to remove the board 21.4 from the changing table 31 in the situation by using the unloading device 50 in the situation according to FIG. 3, the fork system 51 may be moved downward in the open position by the second hoisting device 55 until the forks 52 can be pushed beneath the board 21.4 in a transition of the fork system 51 into the closed position so that the board 21.4 can be gripped and supported from beneath. Then the board 21.4 can be separated from the changing table 31 by raising the fork system 51 by the second hoisting device 55. To achieve the result that boards which have been deposited on one of the changing tables 31 or 32 can be picked up by the forks 52 without damage, a grating 33 (see FIG. 2) is placed on the top side of each changing table 31, 32 as a support for the boards to be conveyed. The grating 33 has horizontal grooves on its top side, designed so that the prongs of the forks 52 are guided in the aforementioned grooves in the transition to the closed position and can therefore be pushed gently beneath a board that has been deposited on the grating.

FIG. 2 and FIGS. 5-22 illustrate the automatic machining system 1 in a cycle of operating states, which may be regarded as an example of the sequencing of a method for loading and unloading the machining machine 2 according to the present invention. The sequencing of the method is controlled by a control device (not shown in FIGS. 1-22). FIG. 2 and FIGS. 5-22 illustrate the changing tables 31 and 32 in various stages during circulation between the machining machine 2 and the storage system 10 along the guide rails 34.1, 34.2, 34.3 and 34.4, whereby the changing tables 31 and 32 can be loaded by the loading device 40 and/or unloaded by the unloading device 50. For the sake of simplicity, only the loading and unloading of the changing table 31 are shown here, whereas changing table 32 is always shown in the unloaded state.

Figure 2:
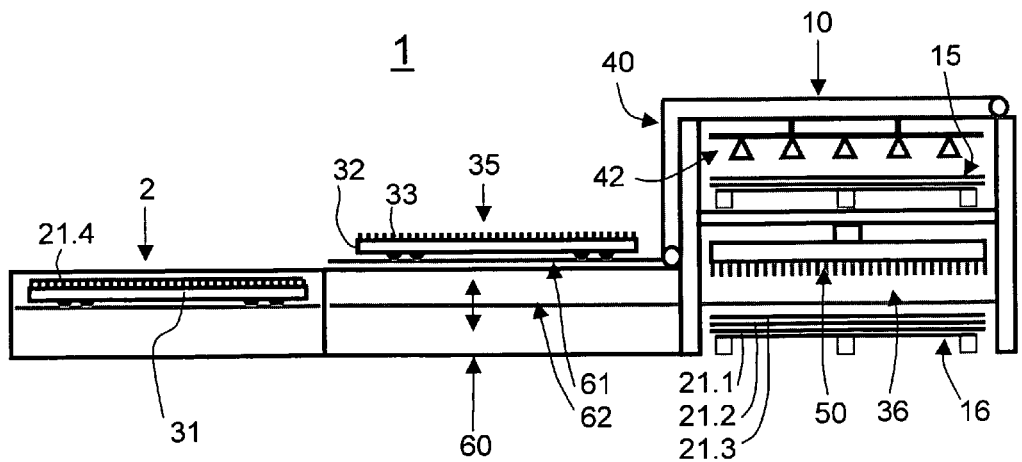
FIG. 2 shows the machining system according to FIG. 1, wherein the loading device is in a different operating state.

FIG. 2 shows the machining system 1 at a starting point of the cycle: the changing table 31 is in a waiting position in the machining machine 2, is loaded with the board 21.4 that is to be machined and is ready for further conveyance to the storage system 10. The changing table 32 is currently situated at the first (upper) waiting place 61 of the changing table changer 60, while the lower waiting place 62 of the changing table changer 60 is empty. The waiting places 61 and 62 are each in the upper position.

FIGS. 5-14 illustrate the conveyance of the changing table 31 to the storage system 10 and the unloading of the changing table 31.

In the first step of the cycle (FIG. 5), the changing table 31 with the board 21.4 that has already been machined leaves the machining machine 2. It is moved to the second waiting place 62 of the changing table changer 60. Both waiting places 61 and 62 now occupied by one of the changing tables 31 or 32. Then both waiting places 61 and 62 are lowered, each now assuming the lower position (FIG. 6).

Figure 8:
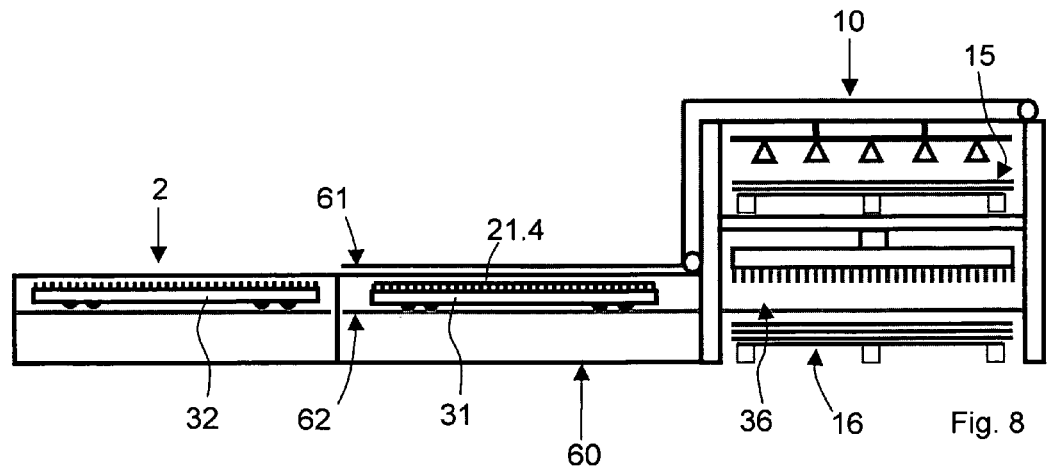
Figure 9:
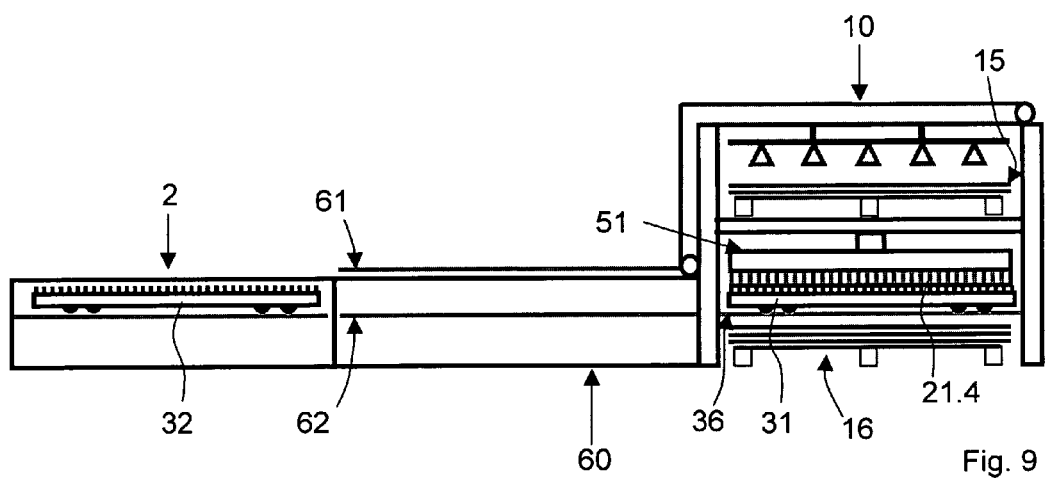
Figure 10:
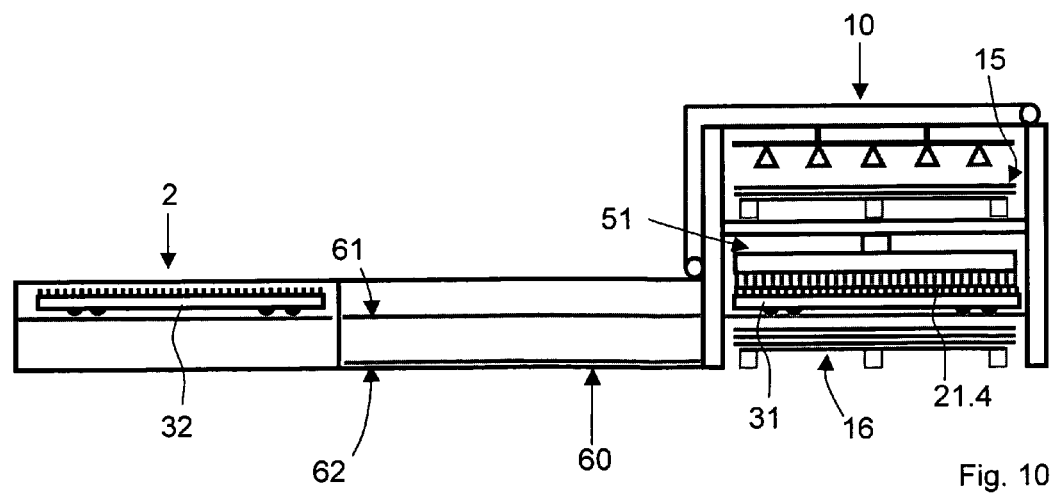

In the next step of the cycle (FIG. 7), the changing table 32 is conveyed from the first waiting place 61 into the machining machine 2. Then the waiting places 61 and 62 are moved into the upper position (FIG. 8).

In the next step of the cycle (FIG. 9) according to the present invention, the changing table 31 is conveyed from the second waiting-place 62 to the unloading place 36 via the second storage place 16. The fork system 51 is currently in the open position and is positioned in such a way that by closing the fork system 51, the board 21.4 that has already been machined can be gripped.

Figure 11:
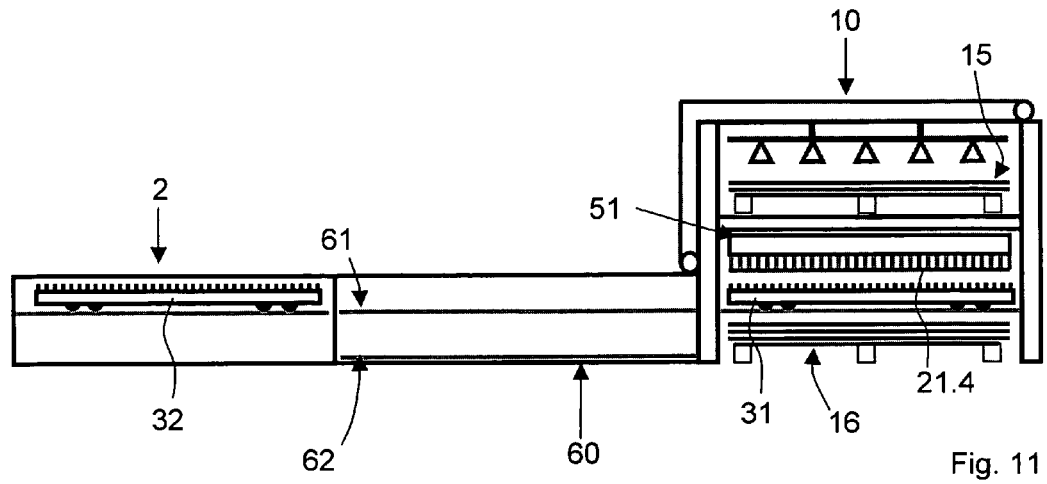
Figure 12:
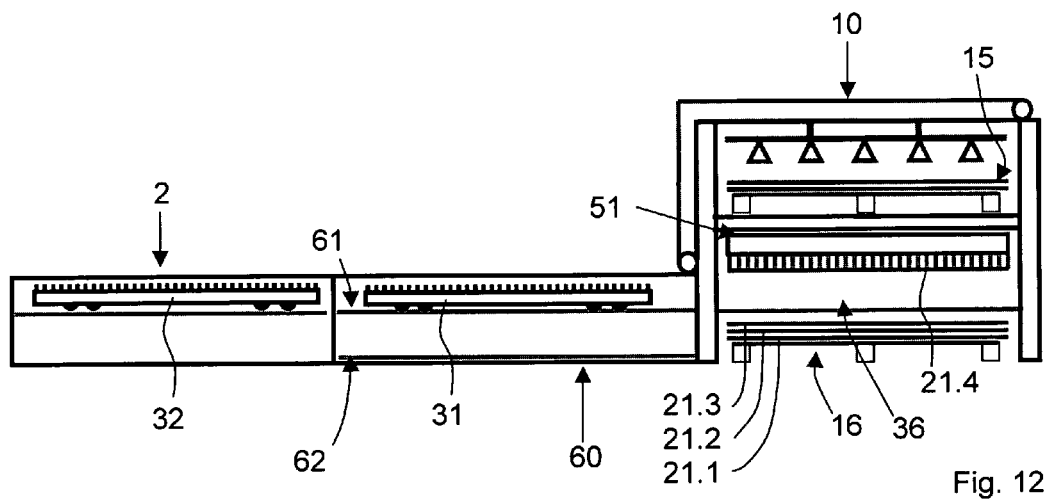

In the next step of the cycle (FIG. 10), the fork system 51 goes into the closed position to grip the board 21.4 that has already been machined. In addition, the waiting places 61 and 62 are each brought to the lower position. Then the fork system 51 together with the machined board 21.4 is raised (FIG. 11). The board 21.4 that has already been machined is thus separated from the changing table 31.

Figure 13:
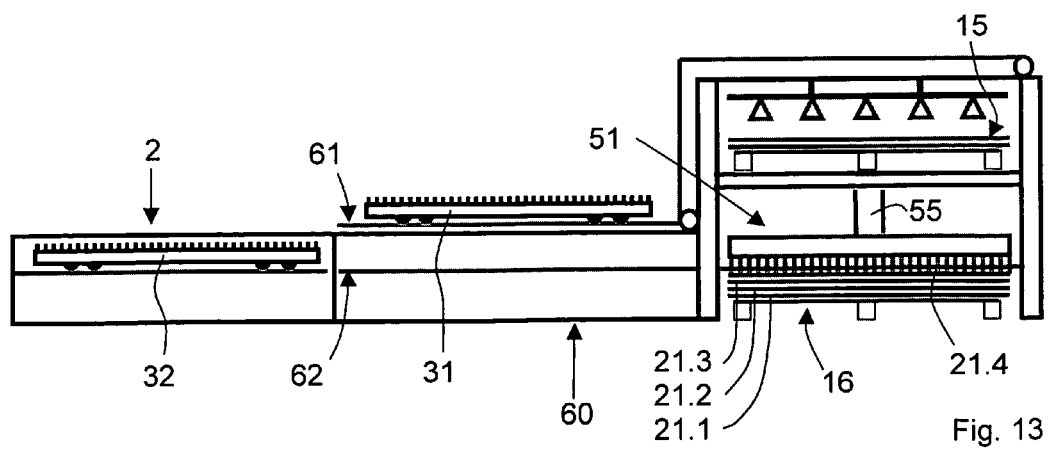

In the next step of the cycle (FIG. 12), the changing table 31, which is now unloaded, is removed from the unloading place 36 via the second storage place 16 and conveyed to the first waiting place 61 of the changing table changer 60. Then the fork system 51 is lowered by the second hoisting device 55 and the machined board 21.4 is deposited on the second storage place 16 (FIG. 13). The fork system 51 is opened for this purpose. In the present example, the machined board 21.4 now rests on the board 21.3. In addition, the waiting places 61 and 62 are each brought into the upper position. Next the fork system 51 is raised again. The loading place 36 is now free and ready to receive the next changing table (FIG. 14).

FIGS. 15-19 show the loading of the changing table 31 (starting from the situation depicted in FIG. 14) with the board 20.2 that is to be machined and is lying in the first storage place 15 at the top.

Figure 14:
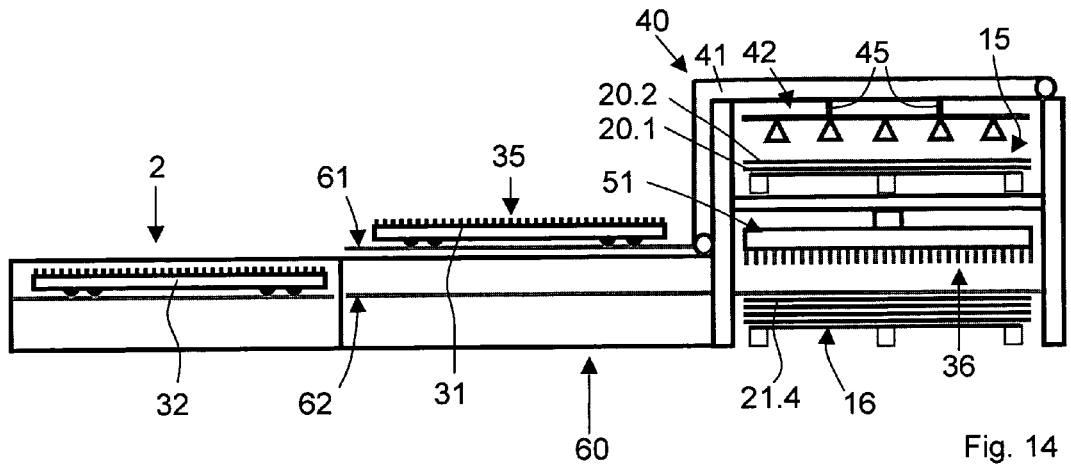
Figure 15:
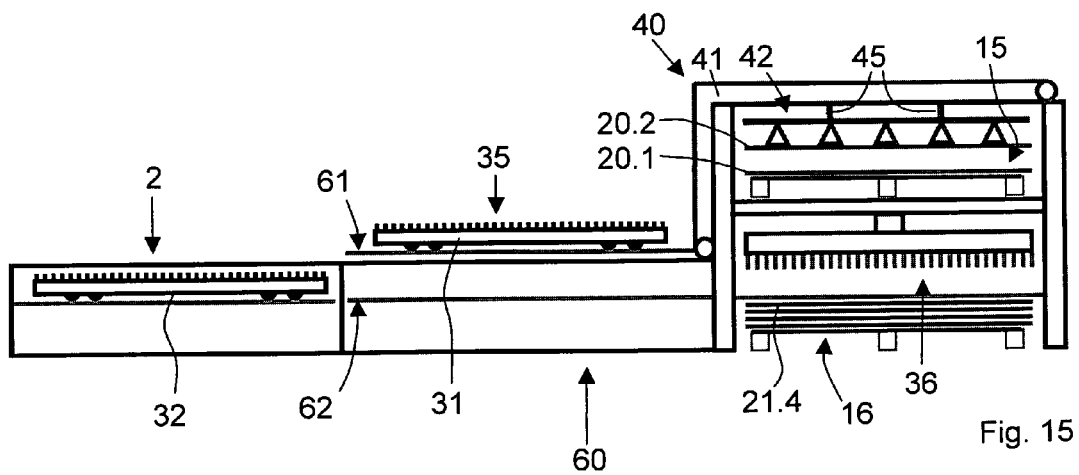
Figure 16:
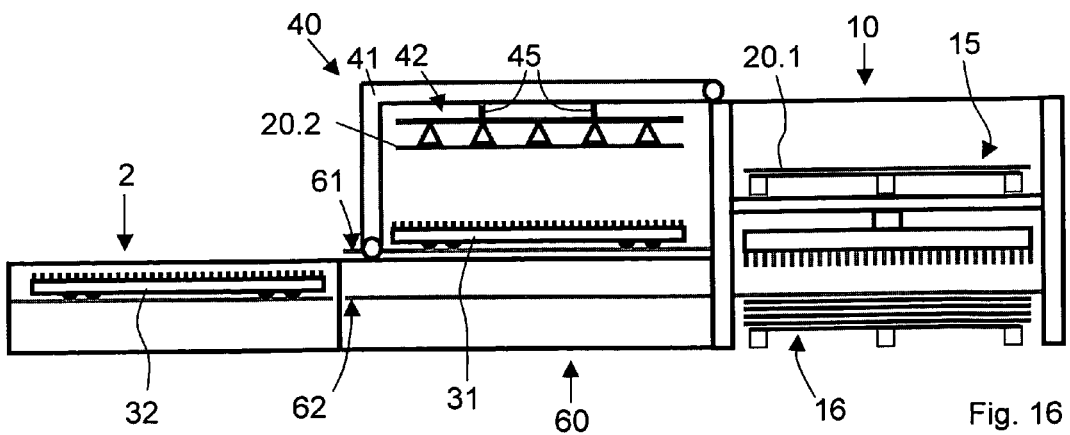
Figure 17:
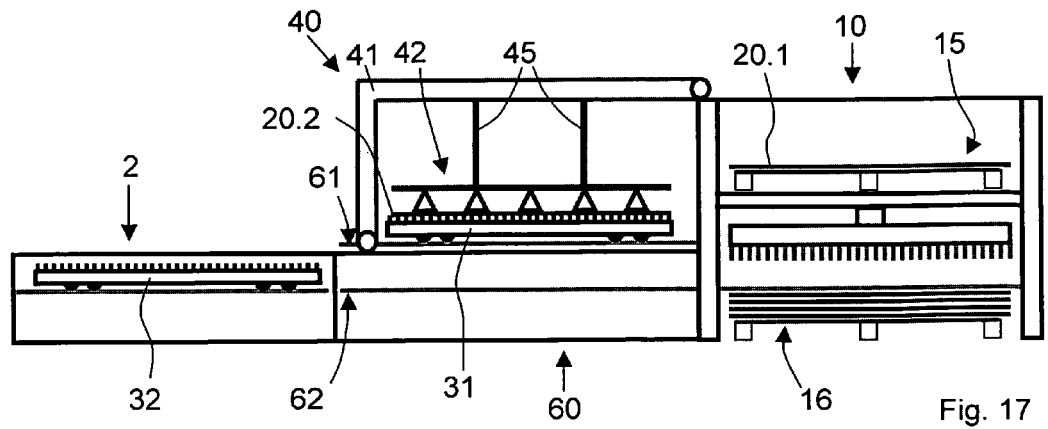

In the present example, the loading place 35 of the changing table 31 sits on the first waiting place 61 of the changing table changer 60 (FIGS. 14, 15). According to FIG. 14, the suction system 42 is arranged first above the first storage place 15. The suction system 42 is then lowered by the first hoisting device 45 to grip the board 20.2 that is to be machined and then is raised together with the board 20.2. The board 20.2 is thereby separated from the first storage place 15 (FIG. 15).

Figure 18:
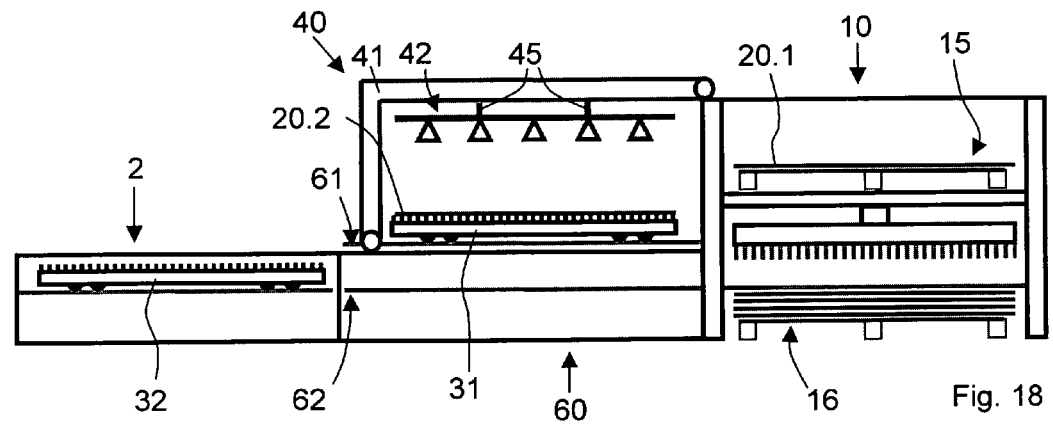
Figure 19:
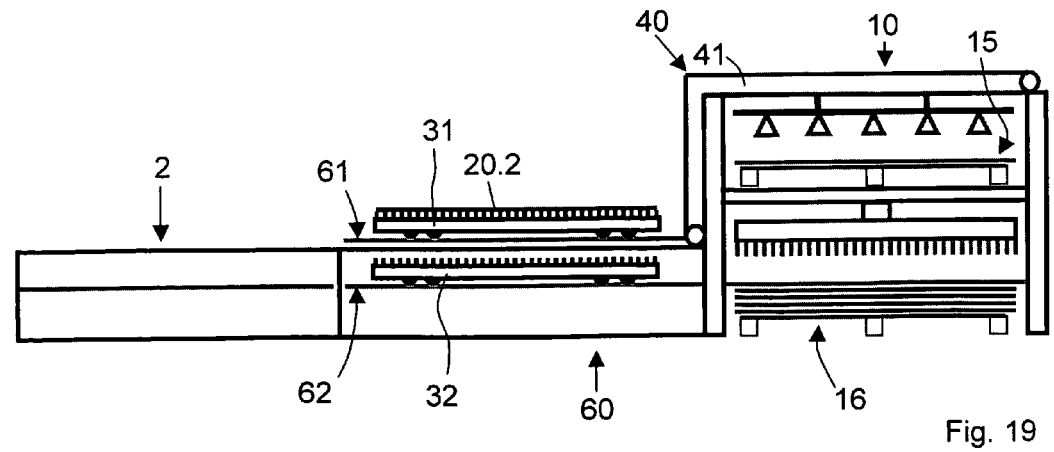

In the next step of the cycle (FIG. 16) the frame 41 of the loading device 40 is moved until the board 20.4 is above the changing table 31. Then the suction system 42 is lowered by the first hoisting device 45, the board 20.2 is deposited on the changing table and released by the suction system 42 and the suction system 42 is raised again by the first hoisting device 45 (FIG. 18). The frame 41 is then moved until the suction system 42 is placed again above the first storage place 15 and thus is ready for gripping another board (FIG. 19). In addition, the changing table 32 leaves the machining machine 2 and changes to the second waiting place 62 of the changing table changer 60.

Figure 20:
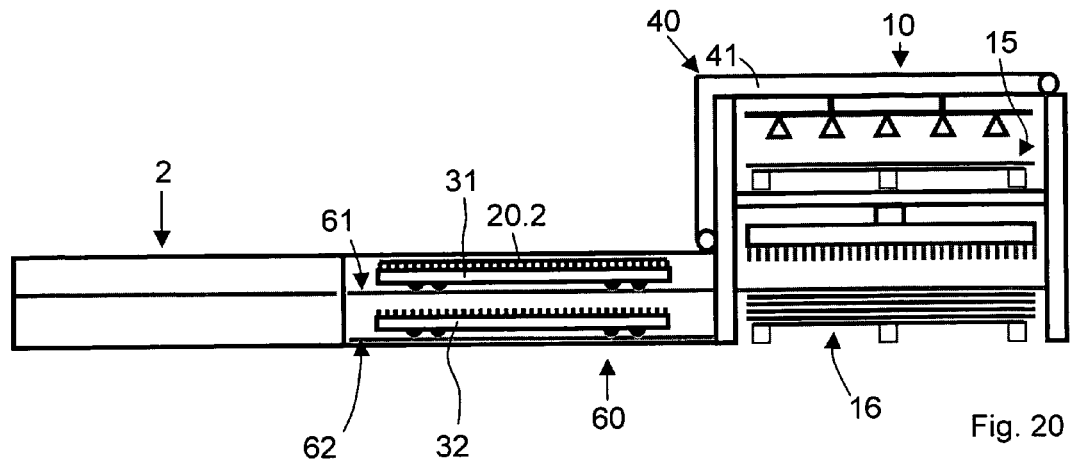
Figure 21:
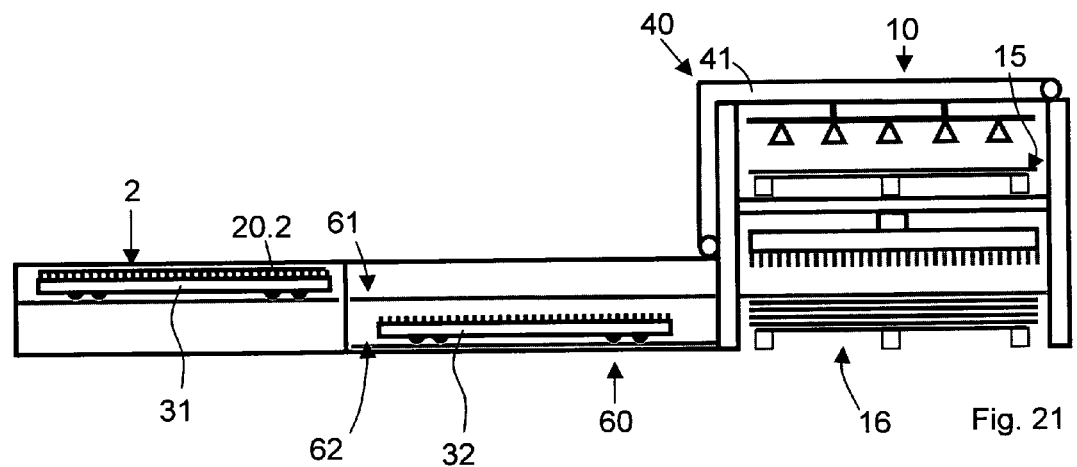
Figure 22:
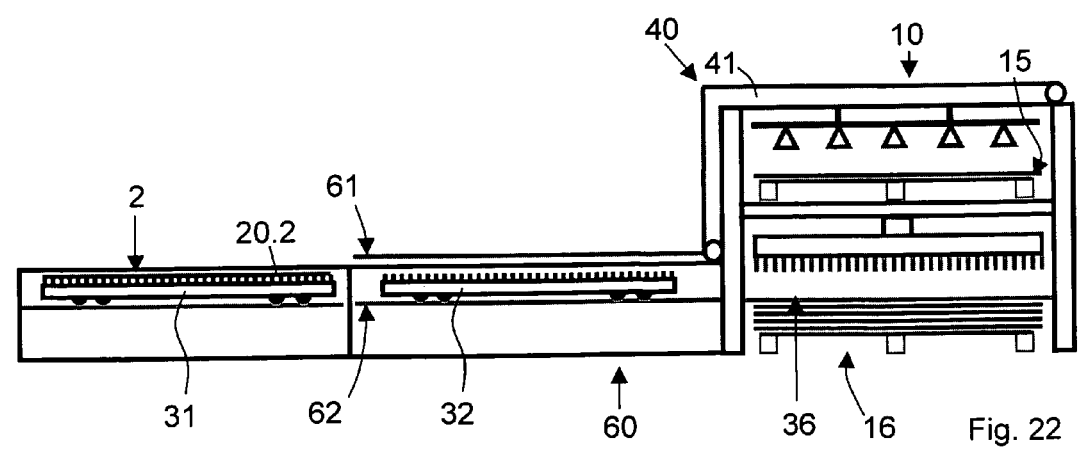

In the next steps of the cycle, the machining machine 2 is loaded (FIGS. 20-22). First, the waiting places 61 and 62 are brought into the lower position. The changing table 31 is then conveyed into the machining machine 2 together with the board 20.2 that is to be machined (FIG. 21). Next the waiting places 61 and 62 are again brought into the upper position. The changing table 32 is thus ready to change from the changing table changer 60 to the unloading place 36 via the second storage place 16.

Figure 23:
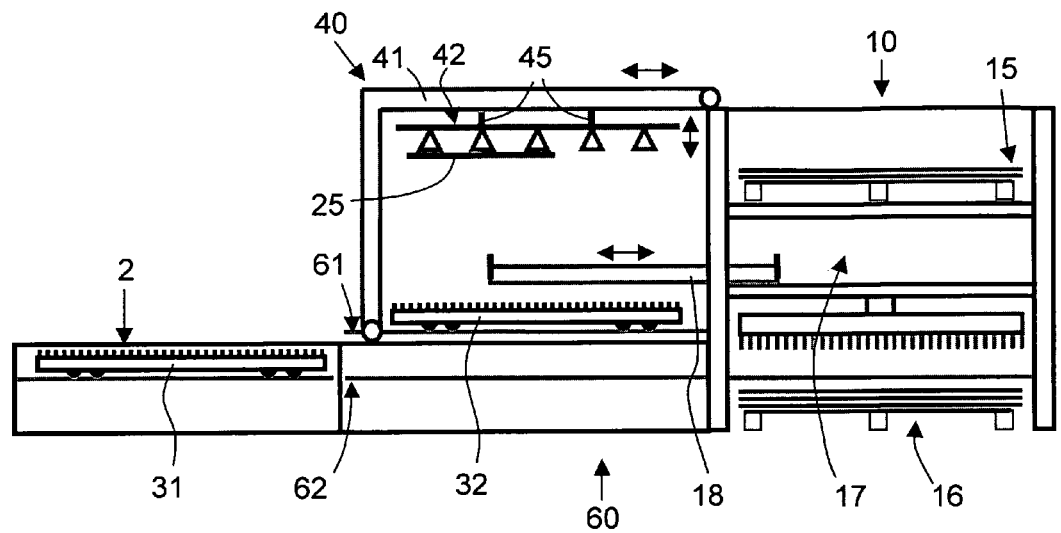
FIG. 23 shows a second embodiment of a machining system in accordance with the present invention which varies in part regarding the embodiment of FIG. 1 by using an additional third storage place for the individual parts to be removed and a device for removing the individual parts.

FIG. 23 shows a further embodiment of the automatic machining system 1 shown in FIG. 1 and in particular the storage system 10. The suction system 42 of the loading device 40 with its plurality of suction cups is suitable for gripping even smaller individual parts, the size of which corresponds to only a fraction of the size of one of the boards 21.x and removing them from one of the changing tables. For the case when one of the machined boards 21.x is a board that is broken down into individual parts, it is also possible to grip only a partial quantity of the individual parts with the loading device 40 and separate them from the other individual parts before these other individual parts are handled otherwise (e.g., deposited on the second storage place 16). FIG. 23, for example, illustrates an individual part 25 which was removed from the changing table 32 with the help of the suction system 42. For disposal and/or storage of such individual parts, a third storage place 17 is provided, situated in the storage system 10 between the first storage place 15 and the second storage place 16. The storage place 17 offers room for a drawer 18 that can be pulled out and can be moved at least partially into an area between the suction system 42 and the changing table changer 60 and is thus suitable for receiving individual parts which can be lifted up by means of the loading device and deposited in the pulled-out drawer 18.

Figure 24:
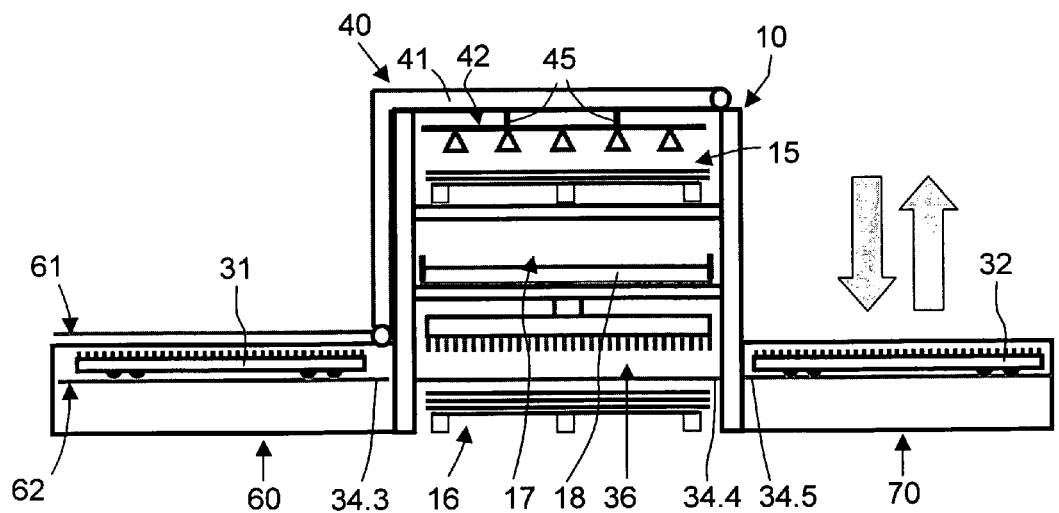
FIG. 24 shows a third embodiment of a machining system according in accordance with the present invention which varies in part regarding the embodiment of FIG. 1 by having an additional parking place for a changing table.

FIG. 24 shows another embodiment of the automatic machining system 1 illustrated in FIG. 1. In the present case, the guide rails 34.4 are continued smoothly and in a straight line by appropriate guide rails 34.5 on the side of the storage system 10 facing away from the changing table changer 60. The guide rails 34.5 are part of a parking place 70 for a changing table. In the example according to FIG. 24, the changing table 32 has been deposited on the parking place 70.

According to this invention, a changing table at the parking place 70 can be removed from the guide rails 34.5 and/or a changing table at a distance from the guide rails 34.5 can be brought in contact with the guide rails 34.5 in such a way that it can be moved along the guide rails 34.5.

When a changing table is in the area of the parking place 70, then there is an opportunity, for example, for a grating 33 or an insert or a support to be installed for depositing at least one of the boards 20.x and/or 21.x on the respective changing table, to be removed from the changing table or to be exchanged on the changing table.

The foregoing description is provided to illustrate the invention, and is not to be construed as a limitation. Numerous additions, substitutions and other changes can be made to the invention without departing from its scope as set forth in the appended claims.

We claim:

1. A device for loading and unloading a machining machine for machining boards, the device comprising:
a storage system comprising:
a first storage place for boards that are to be machined; and
a second storage place for boards that have already been machined by said machining machine;
a conveyance device for conveying, between said first storage place and said machining machine, said boards that are to be machined, and for conveying, between said machining machine and said second storage place, said boards that have been machined, said conveyance device comprising:
a changing table for at least one board of said boards that are to be machined or a board of said boards that have already been machined; and
a loading device for loading said changing table; and
an unloading device for unloading said changing table;
wherein said changing table is adapted to be conveyed between said first storage place and said machining machine and to be brought to a loading place and to an unloading place, said loading device is designed to remove a board that is to be machined from said first storage place and deposit said board that is to be machined at said loading place on said changing table and said unloading device is designed to remove a board of said boards that have already been machined from the changing table at said unloading place and deposit said board that has been machined on said second storage place, wherein said first storage place is arranged directly above said second storage place, wherein said unloading place of said changing table is provided in an area directly above said second storage place, and wherein said board which has been deposited on the changing table can be gripped by said unloading device at said unloading place, separated from said changing table and deposited on said second storage place after removing said changing table.

2. The device according to claim 1, further comprising a changing table changer having at least two guide paths for guiding the changing table, wherein the changing table can be conveyed between said storage system and said machining machine on a path which passes along one of the guide paths of the changing table changer.

3. The device according to claim 2, wherein said loading place of said changing table is provided on one of said at least two guide paths of said changing table changer.

4. A machining system comprising:
a machining machine for machining boards; and
a device for loading and unloading the machining machine for machining boards, the device comprising:
a storage system comprising: a first storage place for boards that are to be machined; and
a second storage place for boards that have already been machined by said machining machine;
a conveyance device for conveying, between said first storage place and said machining machine, said boards that are to be machined, and for conveying, between said machining machine and said second storage place, said boards that have been machined, said conveyance device comprising:

a changing table for at least one board of said boards that are to be machined or a board of said boards that have already been machined; and a loading device for loading said changing table; and an unloading device for unloading said changing table;

wherein said changing table is adapted to be conveyed between said first storage place and said machining machine and to be brought to a loading place and to an unloading place, said loading device is designed to remove a board that is to be machined from said first storage place and deposit said board that is to be machined at said loading place on said changing table and said unloading device is designed to remove a board of said boards that have already been machined from the changing table at said unloading place and deposit said board that has been machined on said second storage place, wherein said first storage place is arranged directly above said second storage place, wherein said unloading place of said changing table is provided in an area directly above said second storage place, and wherein said board which has been deposited on the changing table can be gripped by said unloading device at said unloading place, separated from said changing table and deposited on said second storage place after removing said changing table.

* * * * *